Sept. 11, 1956  J. K. JAKOBSEN  2,762,560
DIFFUSER FOR THE CONVERSION OF KINETIC ENERGY INTO PRESSURE
ENERGY AND AXIAL-FLOW ENGINE PROVIDED WITH SUCH A DIFFUSER
Filed Aug. 6, 1951  2 Sheets-Sheet 1
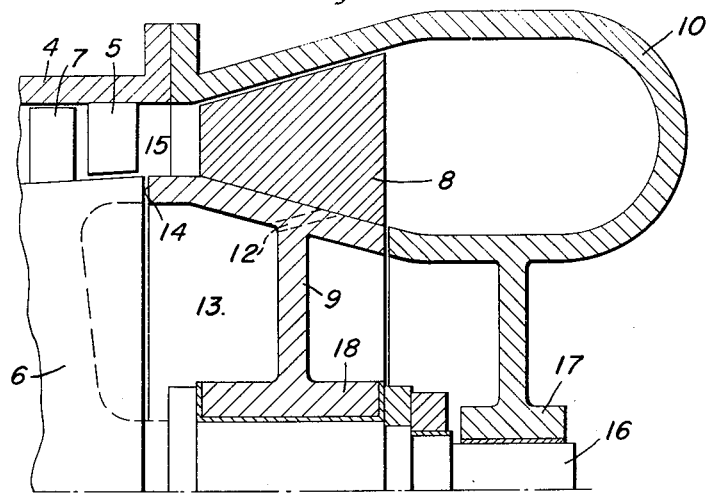
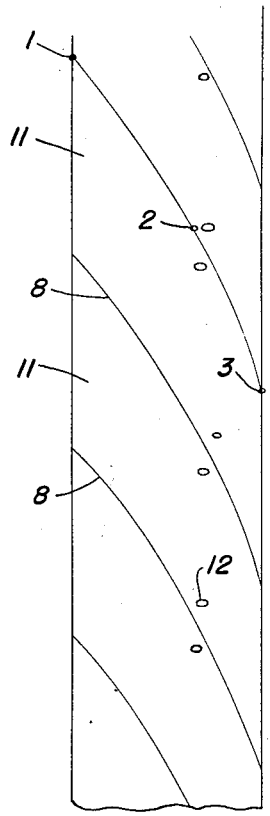
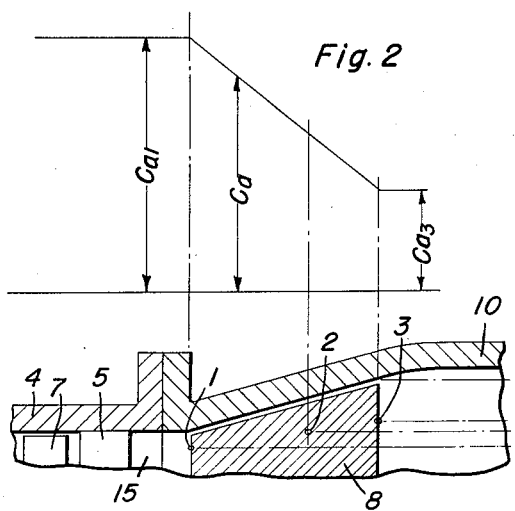
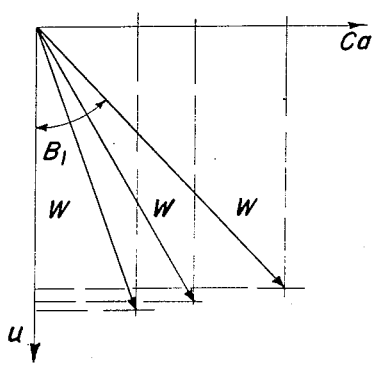
Jakob Knudsen Jakobsen
INVENTOR
BY Stevens, Davis, Miller + Mosher
his ATTORNEYS Jakob Knudsen Jakobsen
INVENTOR

United States Patent Office 2,762,560
Patented Sept. 11, 1956

2,762,560

DIFFUSER FOR THE CONVERSION OF KINETIC ENERGY INTO PRESSURE ENERGY AND AXIAL-FLOW ENGINE PROVIDED WITH SUCH A DIFFUSER

Jakob Knudsen Jakobsen, Copenhagen, Denmark, assignor to Aktieselskabet Burmeister & Wain's Maskin-Og Skibsbyggeri, Copenhagen, Denmark Application August 6, 1951, Serial No. 240,588

Claims priority, application Denmark September 2, 1950

4 Claims. (Cl. 230—122)

The present invention relates to the conversion of the kinetic energy of rapidly flowing media into pressure energy.

For this purpose it is known to use diffusers consisting generally of one or more channels with a cross section area that increases slightly in the direction of the flow. Said channels must in order to yield a good efficiency be constructed very carefully, and in the case of a large energy conversion with a high efficiency, as is often the case with turbines, compressors, and similar machines, diffusers made in accordance with the principles hitherto known will become very large and difficult to fit into the construction. They make the complete machines very extensive and heavy and often entail difficulties as regards the mounting of the bearings for the rotating engine parts.

The purpose of the invention is to reduce said drawbacks and to provide diffusers which with substantially smaller dimensions are able to effect an effective and economical conversion of kinetic energy into pressure energy. The characteristic feature of the invention is first and foremost that the channels in which the diffusion takes place are wholly or partly mounted in or on a freely rotating rotor wheel.

Hereby a strongly increased relative velocity between the flowing medium and the diffuser channels is made possible, and hereby, as will be further proved in the following, it becomes possible to obtain a certain conversion desired with a shorter diffuser channel.

The invention will be further explained in the following with reference to the drawing, on which Fig. 1 shows a longitudinal section through part of the outlet end of a turbine or a compressor with a diffusor in accordance with the invention, Fig. 2 a diagram of the variation of the axial velocity through the diffusor, Fig. 3 a diagram of the variation of the peripheral velocity, Fig. 4 a diagram of the determination of the relative flow velocities, Fig. 5 part of an evolved cylindrical section through the diffuser channels in Fig. 1, Fig. 6 is a longitudinal section through part of the outlet end of a turbine or a compressor with a two-stage diffuser in accordance with the invention, and Fig. 7 is a similar view of a machine comprising a one-stage, fully shrouded diffuser in accordance with the invention.

On the drawing, 4 designates part of the stator in an axial-flow engine which may be supposed to be an ordinary axial compressor with stator vanes 5 and a rotor 6 with rotor vanes 7. The shaft 16 of the rotor is journalled in bearings 17 and carries between the outlet end of the rotor and the bearing 17 located there a freely rotating rotor wheel 9 which is accommodated on the rotor shaft with a bearing 18 and is surrounded by the part of the ordinary outlet channel 10 facing in towards the engine. This rotor wheel carries thin plate vanes 8 which together with the rim of the rotor wheel and the outer wall of the outlet channel 10 form diffuser channels 11 through which under conversion of kinetic energy into pressure energy the working medium flows from the usual annular channel 15 at the outlet end of the engine to the outlet channel 10.

As will be known, the pressure gradient should in an ordinary stationary diffuser be kept down to a suitably low value, as otherwise the boundary layer at the walls of the diffuser cannot be kept in motion in the same direction as the main flow by means of the impulse exchange between the main flow and the boundary layer. The stationary diffusers generally used therefore get a comparatively great length reckoned in the direction of the flow. The impulse exchange is proportional to the second power of the flow velocity of the medium in the diffuser channels, which velocity is in stationary diffusers the same as the absolute flow velocity of the medium. By the application of a rotating diffuser in accordance with the invention the flow velocity in the diffuser channels, i. e. the relative velocity between the medium and the diffuser, may, however, be made to exceed the absolute flow velocity considerably, as will be proved in the following, and therefore there may by the invention be attained a considerably greater impulse exchange and be operated with a correspondingly greater pressure gradient. On account of this the diffusion may be effected with a considerably shorter diffuser.

At an optional point of the diffuser channel, $c_a$ designates the axial velocity of the medium, $u$ the peripheral velocity of the diffuser channel, and $w$ the relative velocity.

Fig. 2 shows the variation of the axial velocity $c_a$, $c_{a1}$ being the velocity at which the medium arrives at the diffuser, and $c_{a3}$ the velocity at which it leaves the diffuser.

Figure 3:
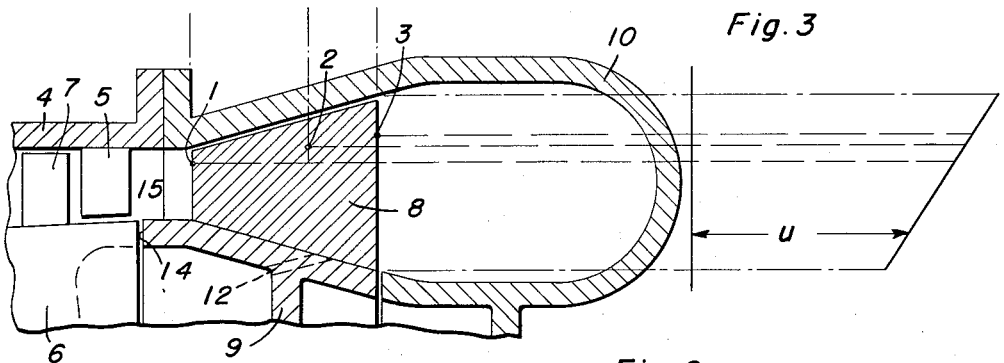
Fig. 3 shows how the peripheral velocity varies with the distance from the axis of rotation.

On the basis of this the value and the direction of the relative velocity $w$ are in the usual manner determined by geometrical addition of $c_a$ and $u$. This determination is shown in Fig. 4 for the points 1, 2, and 3 in Fig. 1, from which it appears that the relative velocities $w$ can assume far higher values than the absolute velocities $c_a$.

In accordance with an expedient embodiment of the invention the diffuser vanes is at any point given an angle $\beta$, which corresponds to the direction found of the relative velocity $w$, so that no deflection of the flowing medium will occur. The cross section area of the diffuser channels measured at right angles to the direction of the flow is in accordance with the invention so adapted as to increase evenly from the inlet to the outlet corresponding to the reduction of the absolute velocity desired out of regard to the conversion desired of kinetic energy into pressure energy.

A further improvement of the effect of the rotating diffuser and thereby a further reduction of the necessary length of the diffuser may in accordance with the invention be obtained by the application of boundary layer removal by suction at the points where the impulse exchange is smallest.

This may e. g. as shown in Figs. 1 and 5 be effected by means of holes 12 which put the points of the walls of the diffuser, where suction is to be effected, in communication with a space 13 on the low-pressure side of the rotor wheel 9, which space is put in communication with a space where a pressure prevails that is suitably lower than the pressure in the particular range of the diffuser. In the embodiment shown the space 13 is through a slot 14 between the rotor and the diffuser rotor wheel 9 put in communication with the annular channel 15.

Figure 7:
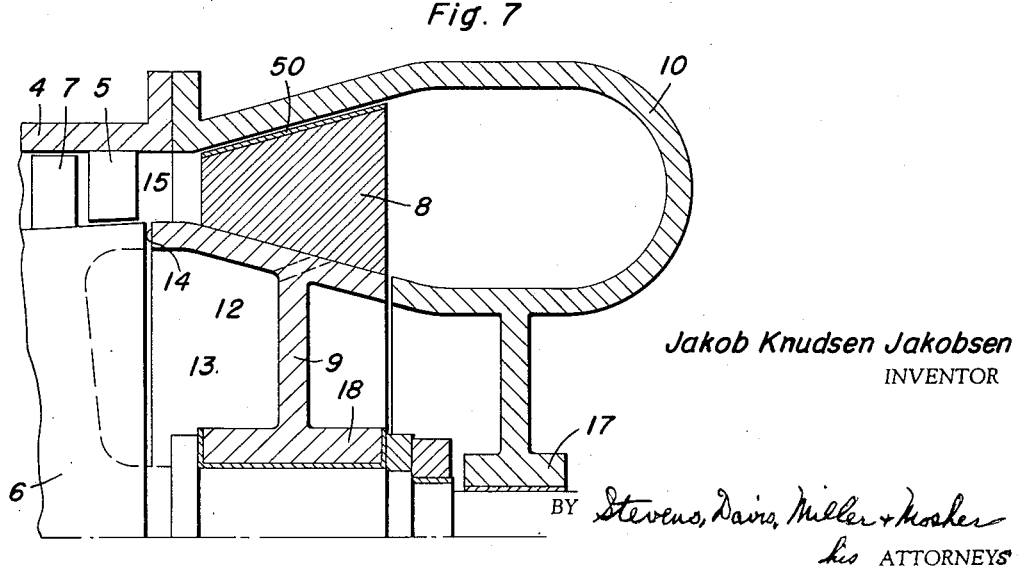

A corresponding abstraction through suitably distributed holes or slots may be arranged from other ranges of the wall of the diffuser channel than shown on the drawing, e. g. by means of holes or slots in several rows behind each other in the circumference of the diffuser rotor wheel or by one or more rows of holes or slots in the outer bounding of the diffuser channel or contingently in the diffuser vanes. The outer bounding of the diffuser channels may as shown be formed by part of the outlet channel 10 or it may consist of a shroud 50 rotating with the vanes as shown in Fig. 7.

In some cases, e. g. where a high velocity ratio is desired for the diffuser, which means the ratio between the inlet velocity of the diffuser and its outlet velocity, or when an especially short diffuser be desired, it may be advantageous to divide the velocity conversion between several successive, mutually independent, freely running, rotating diffusers, each of which is so constructed that they run at the rate of revolution that is most favourable for the energy conversion and the shape of the vanes.

Figure 6:
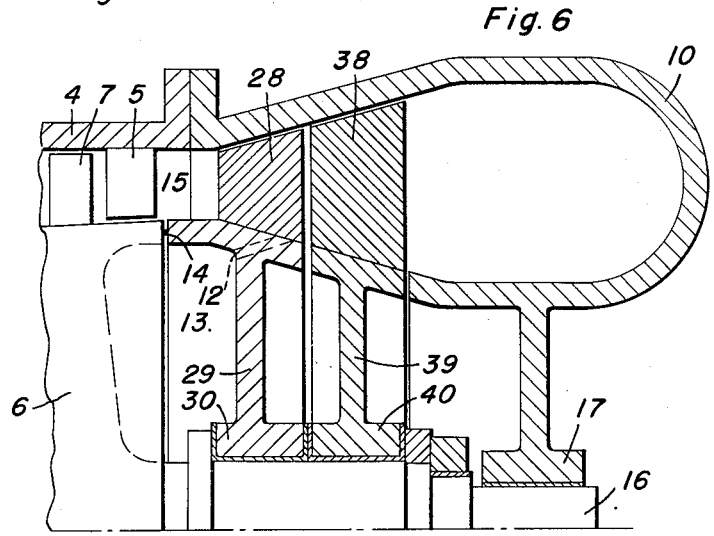

Such two-stage diffuser is shown in Fig. 6 which is a view similar to the view shown in Fig. 1 and with the same references applied to corresponding parts. In lieu of the single diffuser wheel 9 of Fig. 1 two independent diffuser wheels 29 and 39 are provided in series each journalled for free rotation upon the shaft 16 by means of journals 30 and 40. Each diffuser wheel is provided with vanes 28 and 38 respectively.

The fact is that the effect of the rotating diffuser depends upon, as was explained above, an increase of the relative velocity $w$ of the medium in relation to the absolute flow velocity $c_a$. It is therefore a matter of having the proportion $$\frac{w}{c_a}$$

as large as practically possible.

From the diagram in Fig. 4 will be seen that $$\left(\frac{w}{c_a}\right)^2 = 1 + \left(\frac{u}{c_a}\right)^2 = 1 + \frac{1}{\tan^2 \beta}$$

A large value of $$\frac{w}{c_a}$$

is consequently obtained by $\beta$ being made small.

If for the sake of simplicity the flow on a cylindrical surface is considered, it will easily be seen that for a certain rotating diffuser $\beta$ will get its smallest value $\beta_3$ at the outlet from the diffuser, as $$\tan \beta_3 = \frac{c_{a3}}{u} < \tan \beta_2 = \frac{c_{a2}}{u} < \tan \beta_1 = \frac{c_{a1}}{u}$$

For practical, constructive reasons the angle $\beta_3$ cannot without difficulty be made smaller than about 15–20°:

If the proportion between the outlet velocity $c_{a3}$ and the inlet velocity $c_{a1}$ is e. g. 0.4, as in the embodiment example shown on the drawing, and $\beta_3 = 20$; i. e. that $\tan \beta_3 = 0.364$, will be obtained $$\tan \beta_1 = \frac{c_{a1}}{u} = \frac{c_{a3}}{u} \times \frac{c_{a1}}{c_{a3}} = \tan \beta_3 \times \frac{c_{a1}}{c_{a2}} = \frac{0.364}{0.4} = 0.91$$

and from this $$\left(\frac{w_1}{c_{a1}}\right)^2 = 1 + \frac{1}{\tan^2 \beta_1} = 1 + \frac{1}{0.91^2} = 2.21$$

$$\frac{w_1}{c_{a1}} = 1.49$$

$$\left(\frac{w_3}{c_{a3}}\right)^2 = 1 + \frac{1}{\tan^2 \beta_3} = 1 + \frac{1}{0.364^2} = 8.55$$

$$\frac{w_3}{c_{a3}} = 2.92$$

This shows that under said presupposition $$\frac{w_1}{c_{a1}}$$

is only about half as large as $$\frac{w_3}{c_{a3}}$$

If now the velocity conversion is divided between two diffusers in series, for each of which the velocity ratio $$\frac{c_{a1}}{c_{a3}}$$

is chosen as $\sqrt{0.4}$ and $\beta_3$ as 20° will for each of these be obtained $$\left(\frac{w_1}{c_{a1}}\right)^2 = 1 + \frac{1}{(0.364 \cdot \sqrt{0.4})^2} = 3.98$$

$$\frac{w_1}{c_{a1}} = 1.99$$

i. e. larger than before $$\left(\frac{w_3}{c_{a3}}\right)^2 = 1 + \frac{1}{0.364^2} = 8.55$$

$$\frac{w_3}{c_{a3}} = 2.92$$

i. e. the same value as before.

By the application of two rotating diffusers in series, the average value of the ratio $$\frac{w}{c_a}$$

will thus become larger than by the application of a single diffuser, and consequently it will be possible to obtain a larger impulse exchange and to work with a larger pressure gradient, so that there will be a further possibility of reducing the total length of the diffuser.

Furthermore the advantage is gained that the vanes will get a slighter curvature and will consequently be easier to produce.

Another advantage of the application of two or more diffusers in series is that the boundary layer on the vanes of the diffuser and on its channel walls will be interrupted at the transition from one diffuser to the succeeding one, so that the vanes of the latter will work in a sound flow, which fact contributes to improving the internal efficiency of the diffusion.

It is no condition that the inflow of the medium into the diffuser is to occur exactly in the axial direction of the latter, and the outflow from the diffuser may likewise occur at a certain angle to the axial direction, e. g. for the purpose of giving the medium a certain flow direction desired in the outflow channel or at the inflow to an apparatus with stationary or rotating parts succeeding the diffuser. The direction of rotation of the diffuser wheel may be chosen at wish and is not bound by the direction of the rotation for the rotating parts in the engine after which the diffuser may be mounted. In the case of two diffusers with two or more successive diffuser wheels the latter may at wish run in the same direction or in opposite directions, and they may have the same or a different number of vanes.

The invention may be applied in all fields where a conversion of the kinetic energy of flowing media into pressure energy with the least possible loss is needed, but it is of special importance in gas turbine plants where very high flow velocities are operated with and where the dimensions of the individual components should preferably be kept as small as possible.

These demands are especially strict in axial-flow engines, and the invention therefore also comprises such engines in which the rotating diffuser in accordance with the invention is incorporated in an especially expedient way, viz. in the form of one or more diffuser rotor wheels accommodated so as to be freely rotatable on the rotor shaft of said engine directly behind the rotor reckoned in the flow direction of the medium.

The invention is not either bound to engines working with gaseous media, but may also be applied in the conversion of kinetic energy into pressure energy in liquid media.

I claim:

1. A rotary turbo-type energy converting machine having a stator and a vaned rotor forming between them an annular working passage with at least a substantially axial flow of the working medium therein, a diffuser comprising concentric inner and outer walls disposed rearwardly of the stator and rotor, said walls forming between them a substantially annular diffuser passage axially aligned with the working passage, at least one wheel journalled for free rotation coaxially with and rearwardly of said rotor and forming a part of the inner wall of the diffuser, said wheel having radial vanes extending radially across the entire width of the diffuser passage and constituting between them and the said inner and outer walls diffuser passages which receive the working medium from the working passage of the machine for converting velocity energy thereof into pressure energy, said passages having gradually increasing cross-sectional area as measured in a plane perpendicularly to the axis of the rotor in a downstream direction, said vanes forming in any point such an angle with the diffuser axis that their direction substantially coincides with the direction of the relative velocity of undeflected flow through said passages.

2. A rotary machine as in claim 1 in which the vanes are shrouded by an outer plate ring.

3. A rotary machine as in claim 1 in which at least two freely rotatable independent diffuser wheels are arranged in series.

4. A rotary machine as in claim 1 in which said diffuser wheel is journalled on the shaft of the machine rotor in close proximity to said rotor.

References Cited in the file of this patent

UNITED STATES PATENTS

| | | |
|---|---|---|
| 2,321,276 | Debolt | June 8, 1943 |
| 2,334,625 | Hepdner | Nov. 16, 1943 |
| 2,490,066 | Kollsman | Dec. 6, 1949 |
| 2,594,042 | Lee | Apr. 22, 1952 |
| 2,615,301 | Smith | Oct. 28, 1952 |